United States Patent [19]
Mark et al.

[11] Patent Number: 5,570,304
[45] Date of Patent: Oct. 29, 1996

[54] METHOD FOR THERMAL MODELING AND UPDATING OF BIAS ERRORS IN INERTIAL NAVIGATION INSTRUMENT OUTPUTS

[75] Inventors: John G. Mark, Pasadena; Daniel A. Tazartes, West Hills, both of Calif.

[73] Assignee: Litton Systems, Inc., Woodland Hills, Calif.

[21] Appl. No.: 281,348

[22] Filed: Jul. 27, 1994

[51] Int. Cl.$^6$ ................................................. G01C 19/34
[52] U.S. Cl. ................................ 364/571.03; 364/571.02; 364/453; 364/578; 388/902
[58] Field of Search ..................... 331/41; 364/571.03, 364/571.01, 571.02, 453, 454, 578; 388/902; 73/178 R

[56] References Cited

U.S. PATENT DOCUMENTS

| | | | |
|---|---|---|---|
| 4,144,769 | 3/1979 | Mayer | 73/708 |
| 4,314,174 | 2/1982 | Wing et al. | 310/315 |
| 4,651,576 | 3/1987 | Luke | 361/140 |
| 4,675,820 | 6/1987 | Smith et al. | 364/453 |
| 4,823,626 | 4/1989 | Hartmann et al. | 364/453 |
| 5,416,585 | 5/1995 | Hadeler | 356/350 |

OTHER PUBLICATIONS

Article —John W. Diesel, "Calibration of a Ring Laser Gyro Inertial Navigation System For Minimum Velocity Error" Fourteenth Biennial Guidance Test Symposium, vol. II, Oct. 3–5, 1989, pp. 1–1 through 1–20.

Article —John Mark, Daniel Tazartes and Timothy Hilby, "Fast Orthogonal Calibration of a Ring Laser Strapdown System," Proceedings of the Symposium of Gyro Technology, Stuttgart, Germany (Sep. 1986).

*Primary Examiner*—Emanuel T. Voeltz
*Assistant Examiner*—Craig Steven Miller
*Attorney, Agent, or Firm*—Elliott N. Kramsky

[57] ABSTRACT

A method for thermal modeling and updating of bias errors in inertial navigation instrument outputs relies upon piecewise cubic spline encoding of data. The temperature range of the thermal model is divided into contiguous intervals of equal length. Instrument bias-versus-temperature data is encoded on an interval-by-interval basis with all intervals normalized so that cubic polynomials of identical form may be fitted between boundary intervals defined by function values and slopes. Instrument bias error at a measured temperature is estimated in the field and an update point (bias, temperature) established. The particular interval is located and the thermal model is re-fit accordingly in the region of the relevant interval. The spline parameters are then adjusted to accommodate the estimated bias error thereby updating the instrument thermal model of bias.

30 Claims, 11 Drawing Sheets

METHOD FOR THERMAL MODELING AND UPDATING OF BIAS ERRORS IN INERTIAL NAVIGATION INSTRUMENT OUTPUTS

BACKGROUND

1. Field of the Invention

The present invention relates to methods for correcting the outputs of inertial navigation devices for thermally-induced bias errors. More particularly, this invention pertains to a method that utilizes a thermal model calibration that is readily amenable to in-field updating on a continuing basis.

2. Description of the Prior Art

Aircraft inertial navigation relies upon the integration of data throughout a sequence that begins when the aircraft is prepared for takeoff and ends when the aircraft has landed and motion ceased. The inertial navigation system ("INS") of an aircraft includes various components, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. In a strapdown system in which the accelerometer is fixed in a relation to the geometry of an aircraft, the gyroscopes that measure the aircraft's attitude also measure that of the accelerometer axes. Data measured by the gyros is employed to resolve accelerometer outputs along the appropriate spatially stabilized axes.

Error sources that affect the accuracy of the gyro and accelerometer outputs require compensation to ensure accuracy of the navigation system measurements and functions. Systems and instruments come in various forms and rely upon disparate technologies to produce outputs. Gyroscopes may include gimballed mechanical or electromechanical arrangements, ring laser and fiber optic arrangements, among others, while accelerometers can be of the pendulous mass type and/or employ ring laser, fiber optic, piezoelectric or silicon technologies. Regardless, each inertial navigation system arrangement is faced, to a greater or lesser extent, with inaccuracies owing to the bias error peculiarities of its functional components. It is well known, for example, that the bias error of a ring laser gyroscope of the multioscillator type is strongly dependent upon temperature. The overall modelled bias error of the device includes a temperature-insensitive term that may be treated as constant and both linear and sinusoidal functions of temperature.

Because inertial grade instruments are required to measure a very large dynamic range of motions, they typically rely on state-of-the-art technologies. These sensors must be able to measure extremely small quantities. For example, a navigation grade accelerometer must measure a few millionths of the standard gravity acceleration, and a gyro must measure a few hundred millionths of the Earth's rotation rate. Often, it is impossible to precisely identify the sources of minute errors of these magnitudes. Instead, the instruments are typically corrected for global parameters such as temperature. This type of correction requires a model which is presumed to be repeatable.

When an INS is calibrated, the behaviors of its instruments' bias errors as functions of temperature are routinely modelled. This is done in recognition of the fact that the instruments will face and be required to operate over a range of temperatures when in field use. Such a range is an inevitable consequence of off-on operation as well as variations in location, altitude and cooling air temperature.

The instrument model is then employed by the inertial navigation system to compensate instrument outputs. Bias error characteristics will generally undergo perceptible changes over the long term. For example, it is possible to model or calibrate the bias-error-versus temperature characteristic of a ring laser gyroscope of the multioscillator type at the factory over a maximum temperature range. This model may then be employed in operational software to compensate for predicted errors. Nevertheless, the gyro thermal model can gradually shift during hundreds of hours of operation to such an extent that the model is degraded. Eventually, the INS may be returned to the factory or other remote facility for calibration or remodeling of its temperature-sensitive component devices.

The mean time before repair ("MTBR") of an INS is thus affected by drift of the modelled thermal bias errors of navigation devices. This has led to past efforts to devise systems and methods for updating the thermal bias error models of navigation devices while in field use. Approaches have included minibiasing at the end of initial alignment, a process described by J. Diesel, in "Calibration of a Ring Laser Gyro Inertial Navigation System For Minimum Velocity Error," Fourteen Biennial Guidance Test Symposium, Central Inertial Guidance Test Facility, Guidance Test Division, 6585th Test Group, Holloman AFB vol. II (Oct. 3–5, 1989) at pages 1—1 through 1–20. Other attempts have involved post-flight updating, and updating using GPS. All of such methods have focused upon adjustment of the temperature-independent term and each method is therefore inherently of only limited utility. As time goes on, the effects of sensor aging and resulting of thermal model degradation upon bias errors become more pronounced.

SUMMARY OF THE INVENTION

The present invention addresses the foregoing and other shortcomings of the prior art by providing, in a first aspect, a method for correcting the output of an inertial navigation instrument for temperature-dependent bias. Such method is begun by making a plurality of measurements of instrument bias. A corresponding plurality of instrument temperature measurements are made and corresponding bias and temperature measurements are associated to form a bias-temperature model.

The model is then encoded into spline parameters that are then stored. An estimate of instrument bias error is made while in use and a temperature measurement made at a corresponding time. The estimate of bias error is coordinated with the temperature to form an update point and the spline parameters are revised in accordance with that update point.

The output of the instrument is read and its temperature measured. Thereafter, an instrument bias value is calculated from the stored spline parameters in accordance with the measured temperature. The instrument output is then adjusted in accordance with the calculated instrument bias value.

In a second aspect, the invention provides a method for correcting the thermal model of bias of an inertial measurement device, such model comprising a plurality of corresponding values of instrument bias and temperature. According to the method, the model is encoded as a spline and the parameters that define the spline are then stored. Instrument bias is estimated at an observed instrument temperature and the estimate, associated with the observed temperature, forms an update point.

The spline parameters are revised in accordance with the update point. Thereafter, instrument bias is computed as a function of temperature using the spline.

In a third aspect, the present invention provides a method for in-field updating of the thermal model of bias of an inertial measurement device. Such a model comprises a series of parameters characterizing instrument bias over a predetermined temperature range.

The method of the claimed invention is begun by measuring the value of bias at a plurality of temperatures throughout the range. Thereafter, the temperature range is subdivided into a plurality of equal temperature intervals, each of which is defined by opposed interval boundaries. A series of cubic polynomials representing a fit to the measured values of bias versus temperature is determined over the intervals such that the functions and slopes of the functions versus temperature are continuous over the range. The value and the slope of each of the functions are calculated at each interval boundary and such values and slopes are stored.

The instrument bias error is then estimated at an observed instrument temperature and the error and temperature associated to form an update point. Thereafter, at least one of the values and slopes are revised in accordance with the update point.

The preceding and other features of the present invention will become further apparent from the detailed description that follows. Such detailed description is accompanied by a set of drawing figures. Numerals of the drawing figures, corresponding to those of the written description, point out the various features of the invention. Like numerals refer to like features throughout both the written description and the drawing figures.

DETAILED DESCRIPTION OF THE PREFERRED EMBODIMENT

Figure 1:
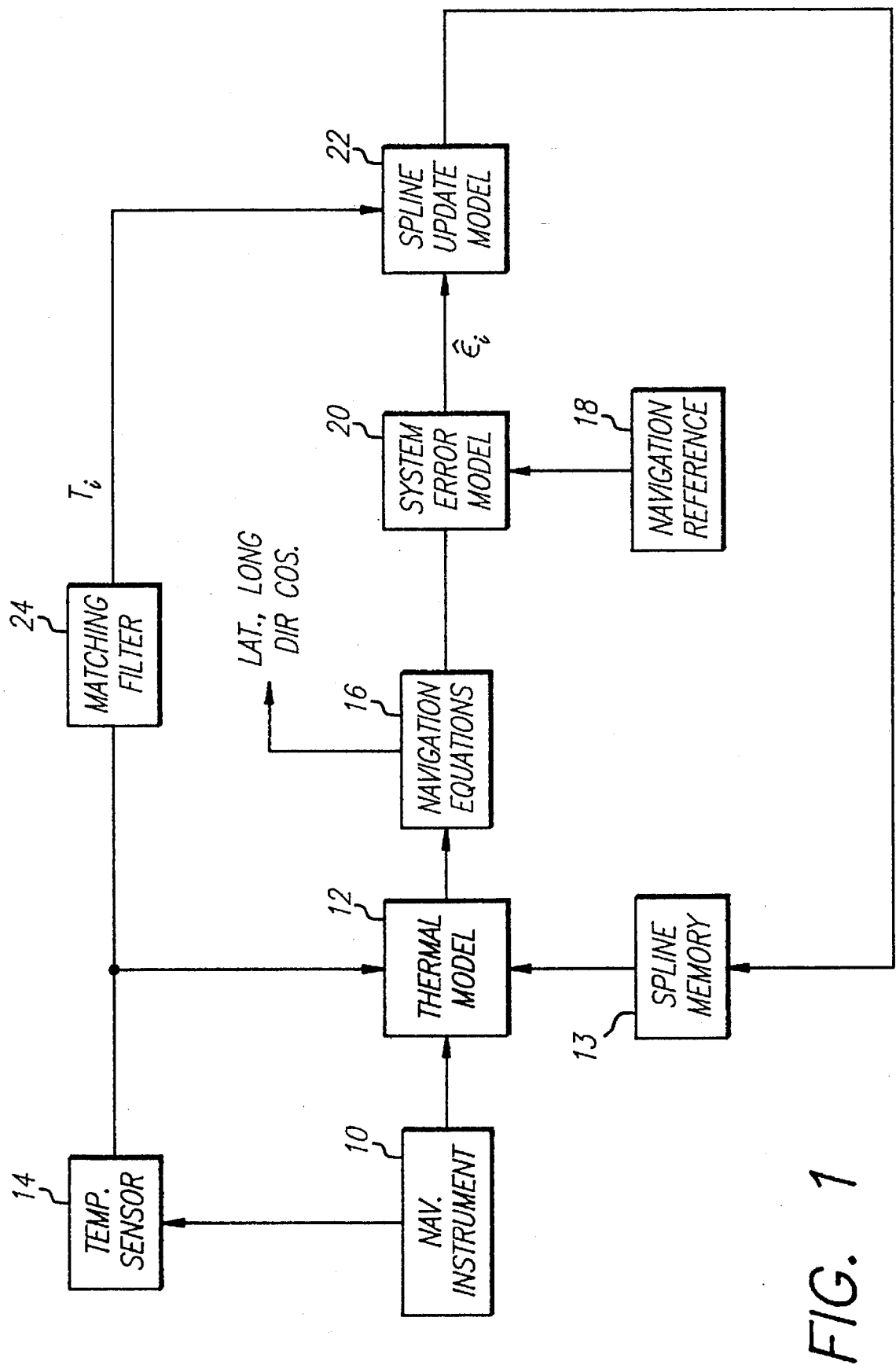
FIG. 1 is a block diagram of the system of the invention for updating the thermal model of bias error for an inertial instrument of an INS.

FIG. 1 is a block diagram of the system of the invention for updating the thermal model of instrument bias for an inertial navigation device. The invention permits continuous in-field updating of the thermal model calibration of any inertial navigation sensor or instrument whose output accuracy is subject to temperature-dependent bias errors. The updating is directed to the most common operating temperature region of the device, enhancing accuracy while reducing the frequency of factory re-calibration and, thus, maintenance and down-time. As will be seen below, the advantages of the invention are obtained by arranging historical bias error data in a format that readily lends itself to "updating" (i.e. minimization of error) on a point-by-point basis. That is, every time a new coordinate (bias error, temperature) point is obtained, the then-existing thermal model is locally reshaped. The inventors have found that a spline-type data format is particularly suitable for use with bias error data obtained from inertial instruments. Such instruments include the multioscillator ring laser gyroscope whose thermal model calibration comprises locally-sinusoidal portions that lend themselves to localized (i.e. regional) corrections. By utilizing a spline data format, it is possible to base a meaningful calibration update upon a single data point.

The system of FIG. 1 includes the navigation instruments 10 of an INS. The instruments 10 provide appropriate outputs, including acceleration $\vec{A}^B$ and rate $\vec{\omega}^B$ in the system of the aircraft's body axes. Such values are input to an "existing" instrument thermal model calibration 12 that computes bias as a function of temperature. The model 12 reflects the "best" information available concerning the relationship between temperature and instrument bias. The thermal model 12 is based upon a spline consisting of polynomials weighted by coefficients, stored in a spline memory 13.

Temperature sensors 14 monitor the inertial navigation devices 10. A gyro bias corresponding to the measured temperature is computed based on the existing thermal model 12 during in-field use. The outputs of the instruments 10 are accordingly corrected for temperature-dependent bias and the thus-corrected values serve as inputs to the navigation equations 16. A detailed description of the navigation equations will follow. As will be seen, the navigation equations of the INS accept the corrected outputs of the instruments 10 and manipulates those outputs to determine the position (latitude and longitude) and to update the direction cosines that relate the inertial instrument outputs to a computed reference platform. The invention is not limited to navigation systems of the strapdown type that employ a computed reference platform. Its teachings may be applied to gimballed instruments that utilize inertial platforms. This simplifies navigation mode operations as well as the ascertainment of instrument bias errors.

The outputs of the navigation equations 16 are combined with a navigation reference 18 in a system error model 20. The system error model 20 is preferably mechanized as a Kalman filter that includes means for estimating errors and applying corrections based upon the assumed error characteristics. In this way, error sources may be separated and compensated. Instrument bias errors can be estimated using relationships describing error propagation in an inertial navigation system. This relationship will be discussed below in conjunction with the discussion of the INS navigation mode. Navigation reference 18 provides the values to which the INS outputs are compared to determine the net errors.

The output of the system error model 20 includes an estimated bias error $\hat{\epsilon}$. This is applied to a spline update model 22. The spline update model 22 also receives a temperature value $T_i$ from a matching filter 24 that synchronizes the continuous output of the temperature sensor 14 with a delay τ that represents the time for estimation and computation of the estimated instrument bias error $\hat{\epsilon}$. It is assumed that τ is sufficiently small so that instrument temperature remains essentially constant. As such, each coordinate ($\hat{\epsilon}_i$, $T_i$) received at the spline update model 22 may be treated as a data point.

As will be discussed, the spline update model 22 performs a series of operations upon each new coordinate data point ($\hat{\epsilon}_i$, $T_i$) that effectively "bends" the existing instrument thermal model 12 within one or more associated temperature intervals. As mentioned earlier, a frequently-occurring bias error-versus-temperature characteristic for an inertial navigation instrument includes sinusoidal waveshapes. The inventors have designed the spline to provide a calibration model that is particularly suitable for localized updating. Also, by providing a method for updating the calibration on a point-by-point basis, the resultant, nearly-continuous recalibration process maximizes accuracy over aircraft operation time.

The process of the invention requires in-field estimation of instrument bias errors. The necessary computations may be effected by a comparison of navigation computations with a value or values supplied by a navigation reference 18. The aircraft may be on the runway or in the air as bias errors are estimated assuming that an appropriate navigation reference 18 has been employed and the INS switched to navigation mode. The navigation reference 18 may be derived from radio navigation (GPS), doppler radar, or the presumption of no motion (parked aircraft).

Signals from GPS satellites can be processed to provide very accurate indications of position and velocity irrespective of the aircraft operation (i.e., parked, taxiing or airborne). Either value can serve as an accurate reference to close the loop of a Kalman filter that processes selected calculations of the navigation equations to thereby generate an estimate of instrument bias error. A process for determining instrument bias error based upon a presumed zero position displacement reference value for a parked aircraft is disclosed in the pending United States patent application of John W. Diesel entitled "Method For In-Field Updating of the Gyro Thermal Calibration of an Inertial Navigation System", Ser. No. 08/281,349 filed Jul. 27, 1994, now pending. The velocity output of the INS navigation mode is input to a fourth order Kalman filter that employs a zero displacement position reference to derive an estimate of acceleration rate. The estimate of acceleration rate is then converted to a tilt rate error that is reduced to a bias error value. The use of Kalman filtering to derive bias errors in inertial navigation is well understood by those skilled in the art and disclosed, for example, in such recognized sources as George R. Pitman, Jr., "Inertial Guidance", John Wiley & Sons, Inc. New York 1962 and Gelb, "Applied Optimal Estimation" (MIT Press 1974).

I. Navigation Equations 16

Figure 2:
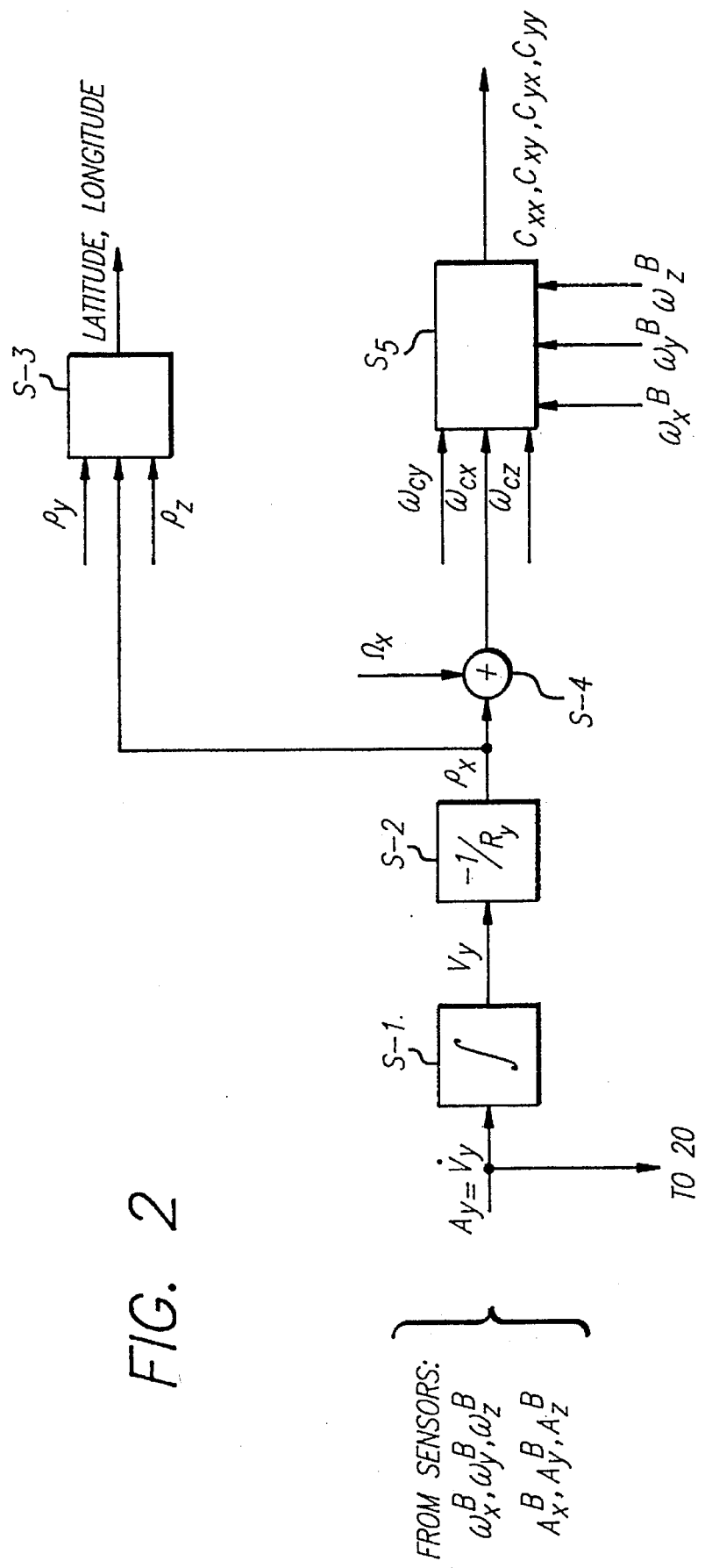
FIG. 2 is a mechanization diagram for illustrating the navigation mode of an INS.

FIG. 2 is a mechanization diagram for illustrating the navigation propagation equations of an INS. The INS comprises the instruments 10 in combination with a flight computer (not shown). The INS software permits several modes of operation including an alignment mode (in which the system locates the vertical using gravity and true North using the Earth rate vector), and a navigation mode in which the instrument data are propagated into velocity and position. If a navigation reference is also available, system navigation errors can be corrected and estimates of the instrument errors made.

A set of rotation rates $\omega_x^B$, $\omega_y^B$ and $\omega_z^B$ is sensed by the gyros of the INS ("B" indicates a value referred to the aircraft body axis coordinate system) while acceleration values $A_x^B$, $A_y^B$ and $A_z^B$ are measured by the accelerometers of the INS.

Referring primarily to the y-axis computation channel of the navigation mode, the acceleration values are converted by means of direction cosines to a computed platform axis system. That is, for the y-channel, $$A_y = C_{yx} A_x^B + C_{yy} A_y^B \qquad (1)$$

The z axis represents the vertical while the x and y directions represent the level axes in the computed platform system.

The accelerations in the computed platform axes are integrated at step S-1 of the navigation mode to provide a velocity $V_y$. This value is then converted to a corresponding craft rate, $\rho_x$, by computing the angular velocity of the vehicle above the Earth using the well known transformation:

$$\rho_x = -V_y/(R_y + h) \qquad (2)$$

Where $R_y$ is the radius of curvature of the earth with respect to the y platform axis and h is the altitude above the surface of the Earth. The craft rate $\rho_x$ provides the aircraft's rate of change of position with respect to the earth. By then integrating the craft rate $\rho_x$ (likewise $\rho_y$) over the entire earth at step S-3, the position of the aircraft with respect to the earth (i.e., latitude and longitude) as well as an angle α (the wander azimuth north direction of the platform axis system in the earth's polar coordinates) are then obtained.

An angular rate $\Omega_x$ defines the component of the earth's rotation rate along the x platform axis. This is added to the craft rate $\rho_x$ at step S-4. The output of this summation represents the total angular rate of the platform axes about the x axis. Similar computations are used to generate the y platform axis angular rate.

The measurements of the angular rates $\omega_x^B$, $\omega_y^B$, and $\omega_z^B$ provided by the gyroscopes are integrated at step S-5 to provide attitude by processes well known to those skilled in the art of strapdown inertial system design and described, for example by John E. Bortz Sr., "A New Concept in Strapdown Inertial Navigation", NASA document TR R-329. Since the gyroscopes sense rotation of the vehicle around the Earth as well as the Earth's rotation, the attitude integration at step S-5 also accounts for such net rotation calculated at the step S-4. Thus, the attitude integration step S-5 receives as inputs both the body rates $\omega_x^B$, $\omega_y^B$ and $\omega_z^B$ from the instruments 10 and the platform rates $\omega_{cx}$, $\omega_{cy}$ and $\omega_{cz}$ from the step S-4. The output of attitude integration step S-5 is a set of direction cosine elements that relate the body axes to the platform axes. The calculated values are updated throughout the navigation process including the time on the ground and airborne as the direction cosines are utilized to transform the aircraft's acceleration from the body coordinates to the platform coordinates.

As mentioned with reference to FIG. 1, system error model 20 operates upon the values computed by the navigation equations 16 and the navigation reference 18 to produce, among other variables, the estimates of instrument bias error upon which the method of the invention operates. Typically, the system error model 20 comprises a Kalman filter. The navigation reference 18 inputs a value to the filter that permits the system error model 20 to derive bias error values for correction of the output of the inertial navigation instrument and for use in updating the instrument thermal model.

II. Thermal Model 12

The thermal model 12 consists of a set of algorithms which employ the measured temperature of the instruments and the stored spline parameters (stored in the spline memory 13) to predict the instrument bias at that temperature. The output of the instrument is compensated. Initially, the thermal model is based upon spline memory coefficients derived during factory calibration and represents the best available characterization of bias as a function of temperature. During field operation, the mechanization proposed by the inventors modifies the spline memory entries and thus the thermal model. Through this modification process, the thermal model is able to track changes in instrument bias behavior with temperature.

III. Encoding of Data into Spline

Figure 3A:
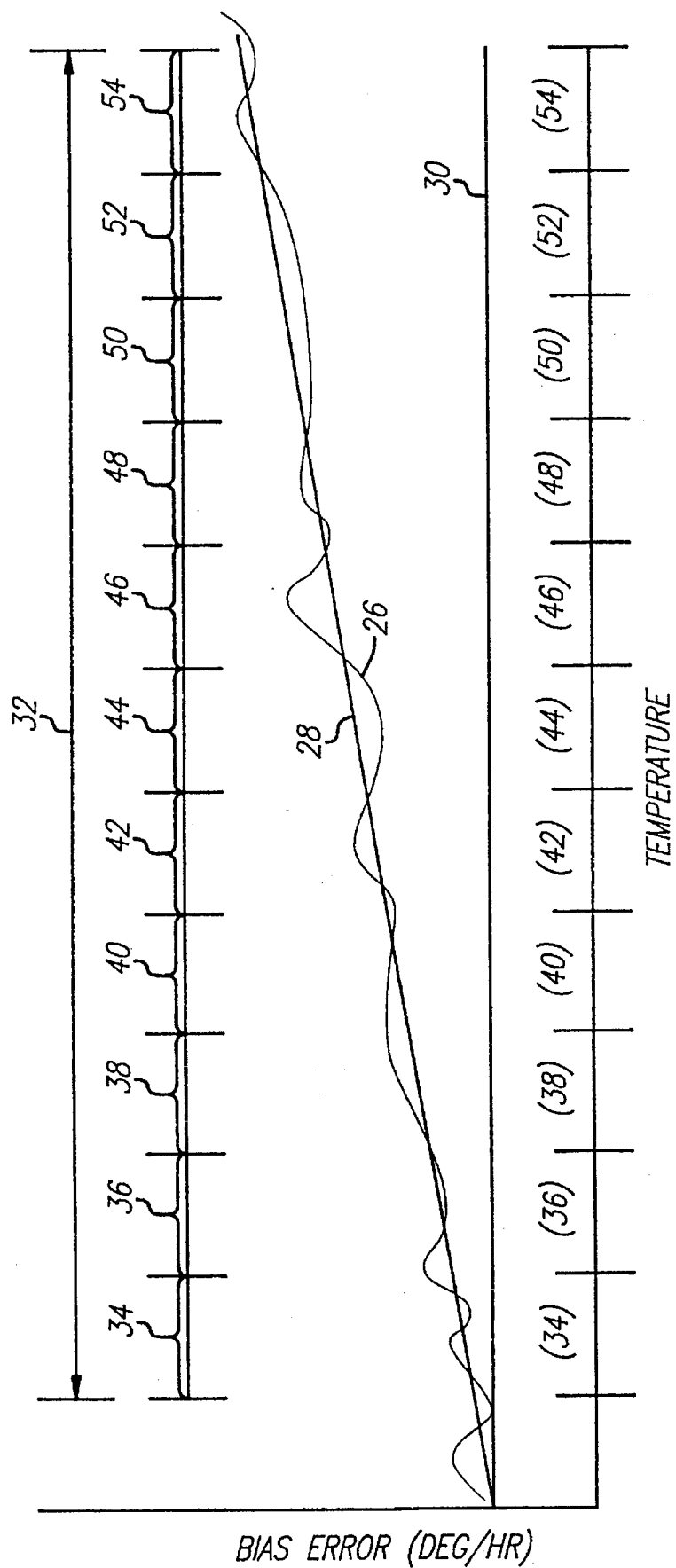
FIGS. 3(a), 3(b) and 3(c) are a series of graphs pertaining to the relationship between bias error and temperature and the encoding thereof into a spline format for application of the method of the invention.
Figure 3B:
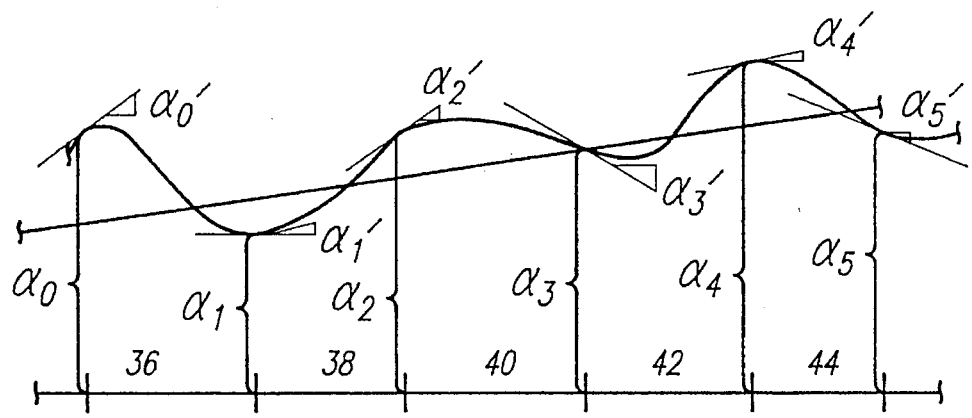
Figure 3C:
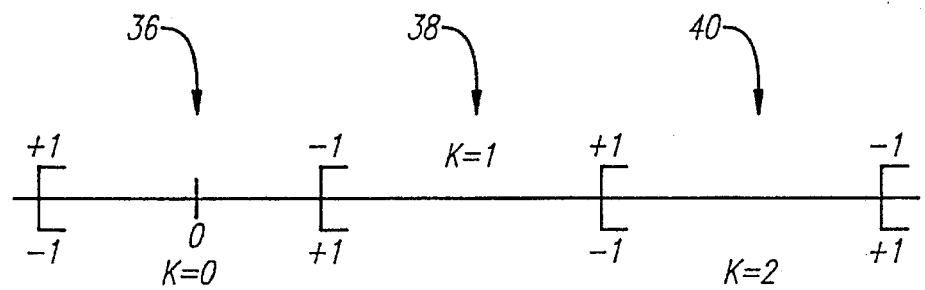

FIGS. 3(a) through 3(c) are a series of graphs pertaining to the relationship between bias error and temperature and to the encoding of such data into a spline format for use in the invention. The data of FIG. 3(a) is presented in the format of the thermal model of bias 12 discussed above.

FIG. 3(a) is a graph of bias-versus-temperature representative of a number of types of inertial navigation instruments including the multioscillator ring laser gyroscope. Such a device is employed in a strapdown-type INS to measure rotation angle about a sensitive axis. It can be seen from FIG. 3(a) that the bias-versus-temperature function (curve 26) can comprise a difficult-to-define series of sinusoids of differing harmonic compositions. This somewhat-irregular function is superimposed upon a linear trend line 28 and a temperature-independent offset 30. As mentioned earlier, the generation of a model of bias-versus-temperature based upon the physical characteristics of a particular device posses an exceedingly difficult task that is complicated manifold by the large number of instrument models and designs. As also mentioned, prior attempts to correct the bias-versus-temperature model in the field have been limited to correction for the temperature-independent function indicated by the curve 30.

In the present invention, the bias error-versus-temperature characteristic of an inertial device is encoded in such a way as to be readily updated (i.e. on a "point-by-point" basis). The formatting or encoding of the calibration improves fidelity by permitting a segmented fit method that is especially appropriate in view of the localized natures of the complex thermal models of inertial instruments. In addition, the present invention employs a normalization method for encoding bias error data that minimizes the required capacity of the spline memory 13 as temperature-segment independent curve fitting polynomials are generated. This simplification further speeds the process of updating the instrument thermal model.

The temperature range of the calibration is indicated at 32. Such range is subdivided into a plurality of temperature intervals 34 through 54. Each interval is of identical length.

FIG. 3(b) is an enlarged view of a portion of the thermal model of FIG. 3(a) for illustrating the encoding of bias-versus-temperature data to a cubic spline format. The encoding of the thermal model is based upon the inventor's recognition that, when function values and slopes are specified at the two boundaries of a temperature interval, it is possible to uniquely specify a third order polynomial of the following form:

$$y(x) = a_0 + a_1 x + a_2 x^2 + a_3 x^3 \quad (5)$$

that will fit the four boundary conditions. As indicated in FIG. 3(b), a pair of values, a function value $\alpha_i$ and a slope $\alpha_i'$ is defined at each boundary between adjacent temperature intervals. In the invention, the two boundary slopes and function values comprise the four boundary conditions. It will be seen later that each temperature interval of length $T_I$ is "normalized". As a consequence of such normalization, the form of the polynomial for fitting data within any temperature interval is identical. The use of function values and slopes at the interval boundaries ensures that the piecewise functions formed by the cubic polynomials within each interval as well as the slopes will be continuous across the boundaries.

FIG. 3(c) is an enlarged view of three adjacent temperature intervals 36, 38 and 40 of the thermal bias error model of FIGS. 3(a) and 3(b) that illustrate the normalization of the temperature intervals. Each interval is assigned a value "K" where K indicates the ordinal position of the range of a particular interval within the thermal model. For example, the temperature interval 36 is shown to be assigned the value "0", the temperature interval 38 assigned the value "1" and the interval 40 assigned the value "2" in FIG. 3(c).

Each temperature interval is normalized to possess an identical range of "−1" to "+1" as shown. Since the upper boundary of each interval coincides with the lower boundary of the following interval (in the direction of increasing temperatures), a bracket is indicated at each interval boundary to separate overlapping notations pertaining to adjacent intervals. The values relating to any interval are indicated by association with the location of the interval number (K), being either above or below the horizontal temperature scale of FIG. 3(c). Referring to FIG. 3(c), the K=0 interval, indicated below the horizontal temperature scale, is normalized by the values indicated at the bottoms of the brackets bounding that interval; the K=1 interval, indicated above the horizontal temperature scale, is normalized between the values indicated at the tops of the brackets bounding that interval, etc. The scale of each normalized interval is linear. Thus, referring to the representative temperature interval 36 (K=0), it can be seen that its mid-point is assigned the median value "0" midway between the values at the interval boundaries. Each interval is identically proportioned.

By normalizing each temperature interval, a set of absolute temperature-independent polynomials $P_i(x)$, $Q_i(x)$ is derived that reduces the storage requirements of the spline memory 13. It can be shown (as derived in the Appendix to this application) that a third order polynomial $F_K(x)$ of the following form can be fitted between the end points of any normalized temperature interval K of the thermal model:

$$F_K(x) = P_o(x)\alpha_K + P_1(x)\alpha_{K+1} + Q_o(x)\alpha_K' + Q_1(x)\alpha_{K+1}' \quad (6)$$

Where $P_o(x)$, $P_1(x)$, $Q_o(x)$ and $Q_1(x)$ ($-1 \leq x \leq +1$) are third order polynomials independent of any particular temperature interval K. As discussed above, $\alpha_K$ and $\alpha_{K+1}$ are values of the bias error thermal model (FIG. 3(b)) at the lower and upper boundaries of the Kth interval and $\alpha_K'$ and $\alpha_{K+1}'$ are the slopes of the bias error model at those points. The polynomials are given by:

$$P_o(x) = \tfrac{1}{4}(2 - x(3 - x^2)) \quad (7)$$

$$P_1(x) = \tfrac{1}{4}(2 + x(3 - x^2)) \quad (8)$$

$$Q_o(x) = \tfrac{1}{4}(1 - x(1 + x(1 - x))) \quad (9)$$

$$Q_1(x) = -\tfrac{1}{4}(1 + x(1 - x(1 + x))) \quad (10)$$

Having defined the cubic spline for piecewise fitting of the thermal model of bias error on an interval-by-interval basis in terms of both interval end points or boundary values ($\alpha_i$, $\alpha_i'$) and polynomials ($P_i(x)$, $Q_i(x)$), the spline-encoded model of instrument bias can be continually and simply updated. With each new measurement, the process disclosed below bends the spline locally to improve the fit to current bias versus temperature behavior. The re-fitting process relies upon a determination of the location of a measured data point with respect to the range of its temperature interval. The solution is then applied to reconfigure the thermal model locally (i.e. in the region of the interval). Such reconfiguration involves recalculation of the four values (two function values and two slopes) defined at the borders of the particular interval.

IV. Updating of Spline-Encoded Data

Figure 4:
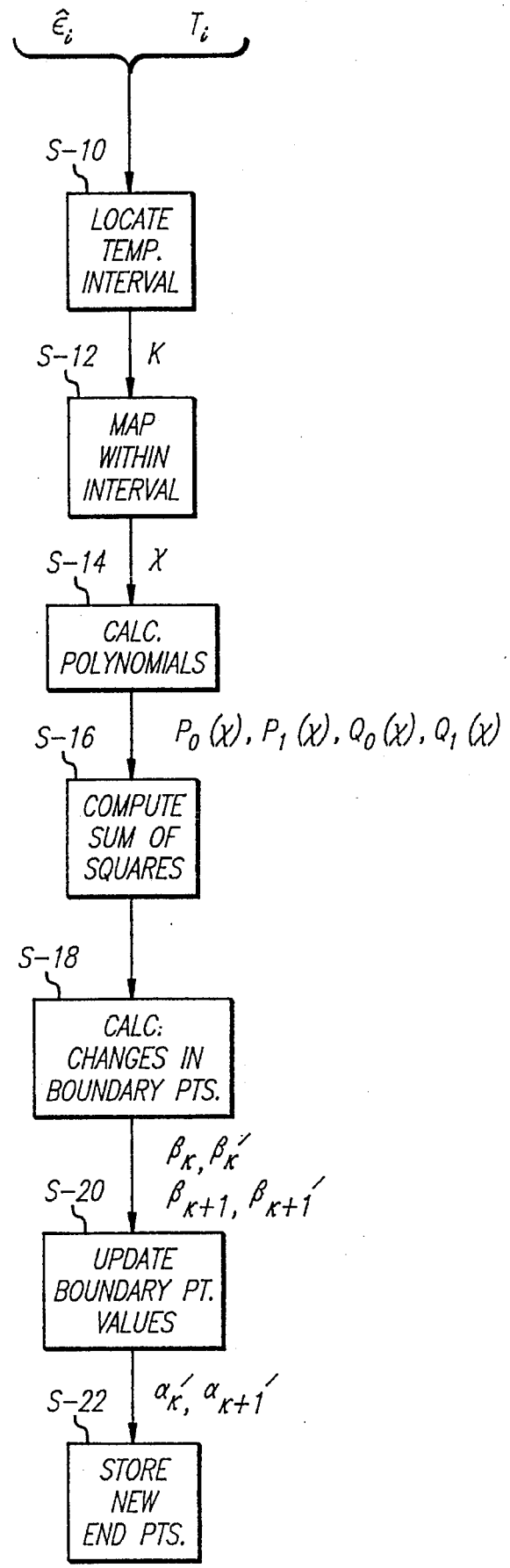
FIG. 4 is a flow chart of the method of the invention for updating a spline-formatted thermal model of bias error.

FIG. 4 is a flow diagram that illustrates the method for updating the thermal model of system error. Such process is associated with the spline update model 22. The updating process is begun with the generation of an estimate of bias error by means of the system error model 20 of FIG. 1 and its association with an instrument temperature $T_i$ to form a bias error-verus-temperature coordinate ($\hat{\epsilon}_i$, $T_i$). The coordinate is received, and the temperature interval of the model identified, at step S-10 by means of the following transformation:

$$K = INT\left(\frac{T_i - T_{LB}}{T_I}\right) \quad (11)$$

where K is the temperature interval number, $T_{LB}$ is the lower bound of the model temperature range and $T_I$ is the (uniform) temperature interval spacing or range.

A normalized temperature x within the temperature interval $T_I$ is calculated at step S-12 as follows:

$$x = 2\left(\frac{T_i - T_{LB}}{T_I} - K\right) - 1 \quad (12)$$

Having derived "x", the polynomials $P_o(x)$, $P_1(x)$, $Q_o(x)$ and $Q_1(x)$ are calculated at step S-14. The specific interval number K, having been calculated at step S-10, and the slopes and function values at the interval boundaries having been stored in the spline memory 13, the spline or cubic polynomial function in the region of the estimate of bias error is now known and defined, for any interval, by equation 6.

Given an estimated bias error $\hat{\epsilon}_i$ at temperature $T_i$ (normalized to $x_i$) within the relevant temperature interval and polynomials $P_o(x_i)$, $Q_o(x_i)$, $P_1(x_i)$ and $Q_1(x_i)$, defined in equations (7) through (10), a set of spline update parameters can be computed to adjust the spline function to better fit the measurements. The method shown below minimizes the sum of squares of the update coefficients to minimize the input of the update on regions where no new bias information is available. This method also has the effect of modifying the spline function in the interval in question and at most the adjoining intervals. Thus, the spline is modified only in the vicinity of the measured bias error versus temperature points. The sum of squares of the polynomials $$D = P_o(x_i)^2 + Q_o(x_i)^2 + P_1(x_i)^2 + Q_1(x_i)^2 \quad (13)$$

is computed at step S-16. This value is used to calculate the spline update parameters as shown below and indicated at step S-18 of FIG. 4. The spline update parameters are defined as:

$$\beta_K = \frac{P_o(x_i)}{D} \delta\epsilon_i \quad (14)$$

$$\beta_K' = \frac{Q_o(x_i)}{D} \delta\epsilon_i \quad (15)$$

$$\beta_{K+1} = \frac{P_1(x_i)}{D} \delta\epsilon_i \quad (16)$$

$$\beta_{K+1}' = \frac{Q_1(x_i)}{D} \delta\epsilon_i \quad (17)$$

The above expressions indicate that the thermal model, updated in the region of $T_i$, is refitted in such region to accommodate the deviation of $\hat{\epsilon}_i$ from the existing, model-predicted value, $\epsilon_i$. Such deviation, $\delta\epsilon_i$, is discussed and illustrated with reference to FIG. 5 below. The refitting process takes the form of recomputation of the values of function and slope at the two boundaries of the relevant temperature interval. Equations 14 through 17 define the changes in each of the four boundary values that are necessary to satisfy a fit of the existing thermal model to $\hat{\epsilon}_i$ with minimum spline coefficient magnitude changes in the region of the particular temperature interval. These changes are then employed at step S-20 to update the values of the model and its slope at the interval boundaries as follows:

$$\alpha_K = \alpha_K + \beta_K \quad (18)$$

$$\alpha_K' = \alpha_K' + \beta_K' \quad (19)$$

$$\alpha_{K+1} = \alpha_{K+1} + \beta_{K+1} \quad (20)$$

$$\alpha_{K+1}' = \alpha_{K+1}' + \beta_{K+1}' \quad (21)$$

Figure 5:
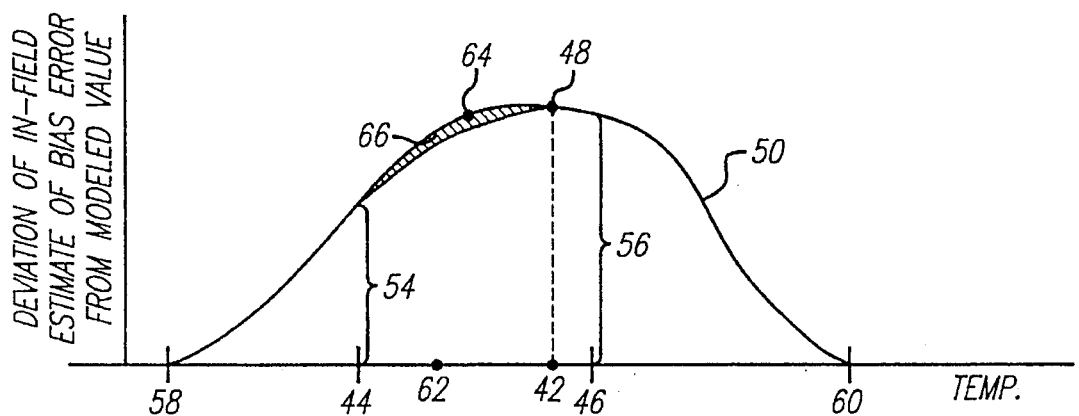
FIG. 5 is a graph of bias error deviation as a function of temperature for illustrating the effect of the method of localized updating of a spline-formatted thermal model in accordance with the invention.

FIG. 5 is a graph that illustrates the above-described process for updating the thermal model on a (measured) point-by-point basis. Temperature, divided into equal intervals as before, is measured along the abscissa while deviation of measured value of bias from modelled value, $\delta\epsilon_i$, is indicated by ordinate value. The modelled value of bias error at a temperature x within a temperature interval K of length $T_I$ is the value of the function $F_K(x)$ as defined by equation 6. The values of $\alpha_K$, $\alpha_{K+1}$, $\alpha_K'$, $\alpha_{K+1}'$ are stored in the spline memory 13 prior to estimation of a new bias error at a temperature 42 within the interval bounded by the temperatures 44 and 46. The deviation of the estimated value from the modelled value is indicated by point 48. The effect of the updating process with respect to the deviation measured at the temperature 42 is indicated by the curve 50. As indicated, the cubic spline curve-fitting process (discussed in detail below) effectively "spreads" the measured deviation. The boundary or interval end point bias error deviations 54 and 56 are employed to recalculate $\alpha_K$, $\alpha_{K+1}$, $\alpha_K'$ and $\alpha_{K+1}'$, reshaping the model to obtain a better fit between existing and updated values. It should be noted that the curve 50 declines to zero at the temperatures 58 and 60 that mark the far boundaries of adjacent temperature intervals. This indicates that a "fit" can be obtained by reconfiguring the thermal model substantially in the region of the temperature interval of the estimated bias error.

A second bias error is measured at temperature 62 within the same interval between boundary temperatures 44 and 46. The measured deviation occasioned by the second value of bias error is indicated by the shaded area 66 as the thermal model in the region of the 44-to-46 temperature interval was previously locally "re-modeled" in accordance with the error or deviation correction indicated by the curve 50. Thus, by taking a plurality of measurements of bias error within a given temperature interval, a convergence process is seen to occur, enhancing the fidelity of the thermal model.

Figure 6:
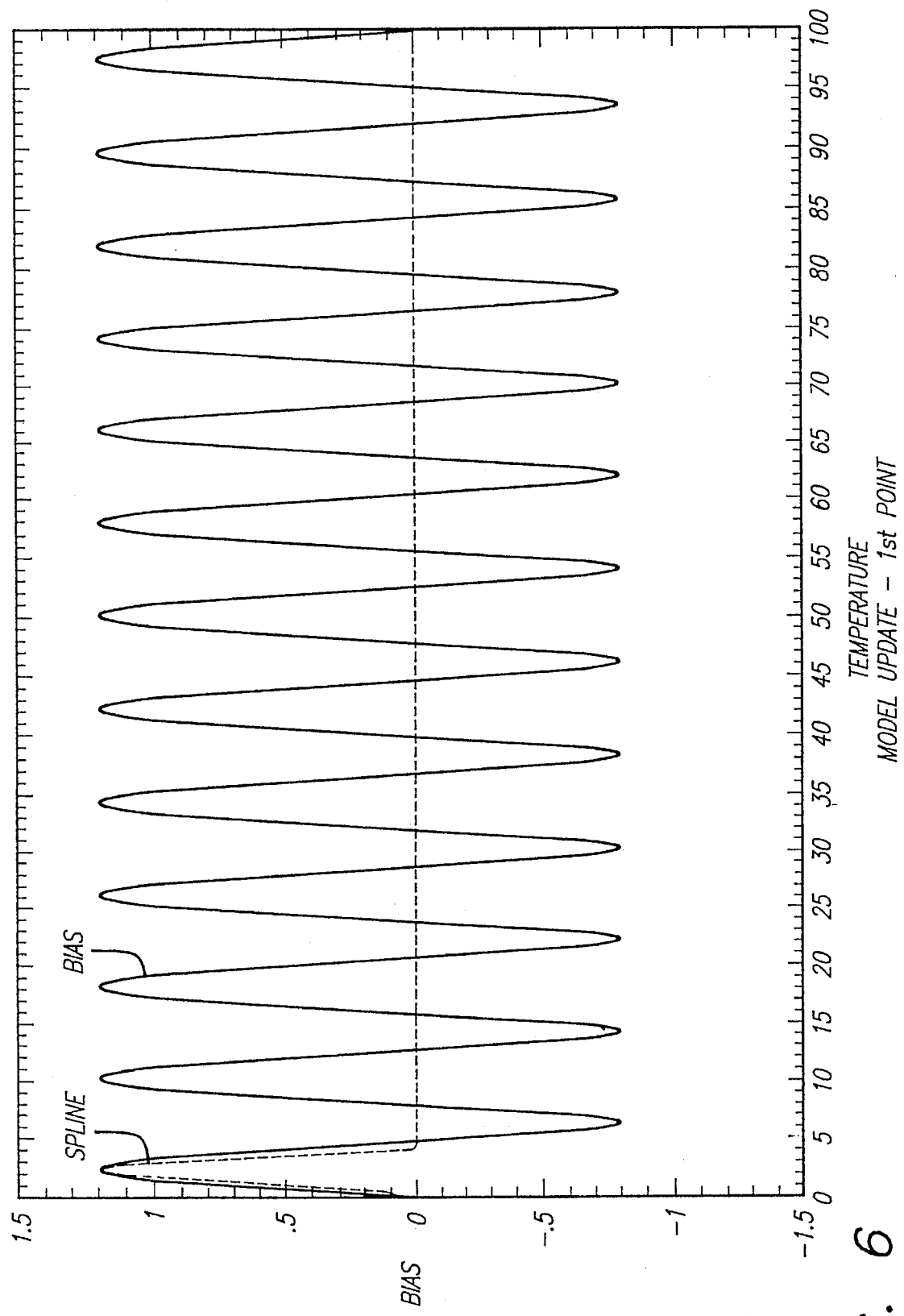
FIGS. 6 through 8 are a series of waveforms based upon a sine wave of unit amplitude for illustrating the process of spline updating.
Figure 7:
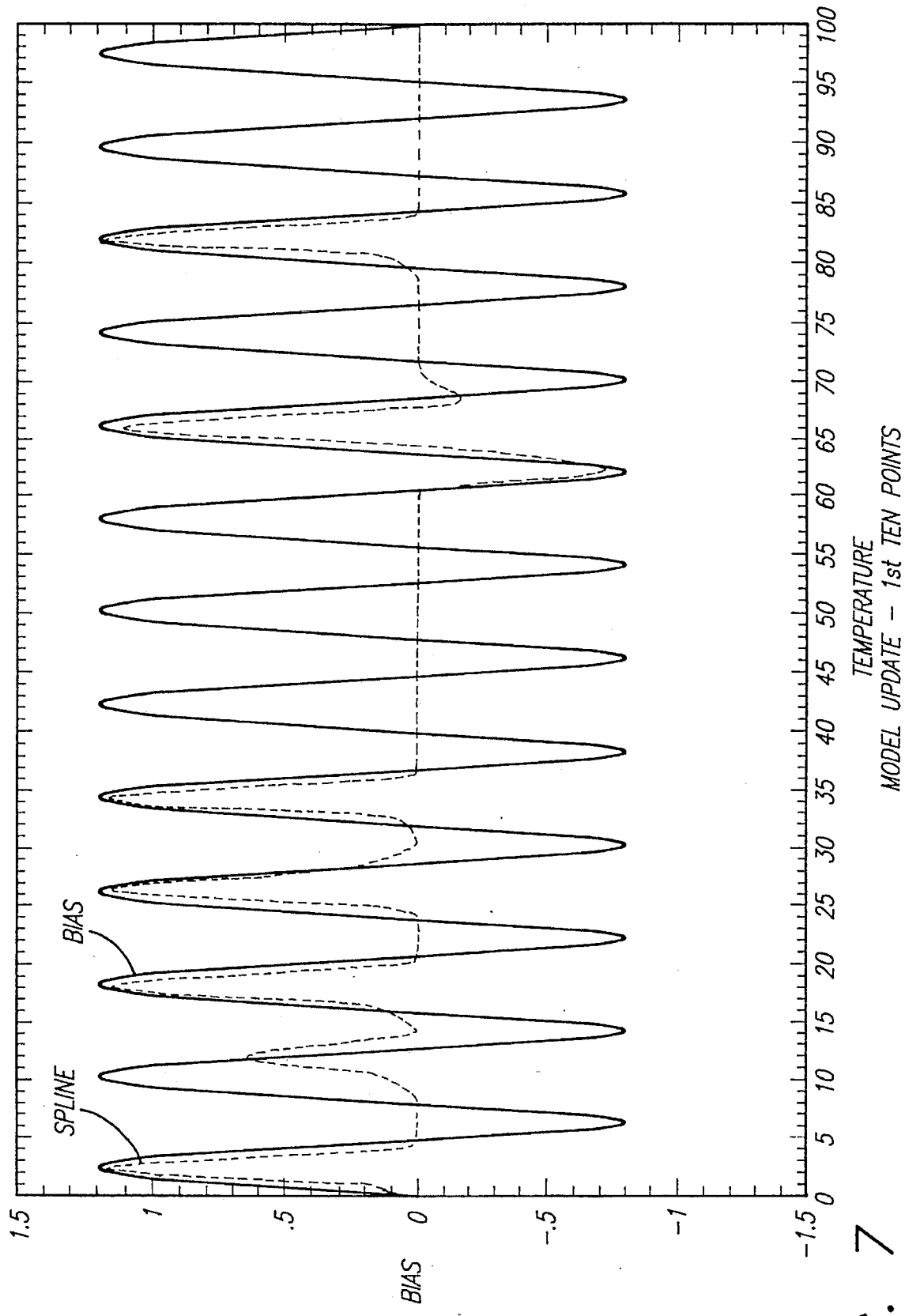
Figure 8:
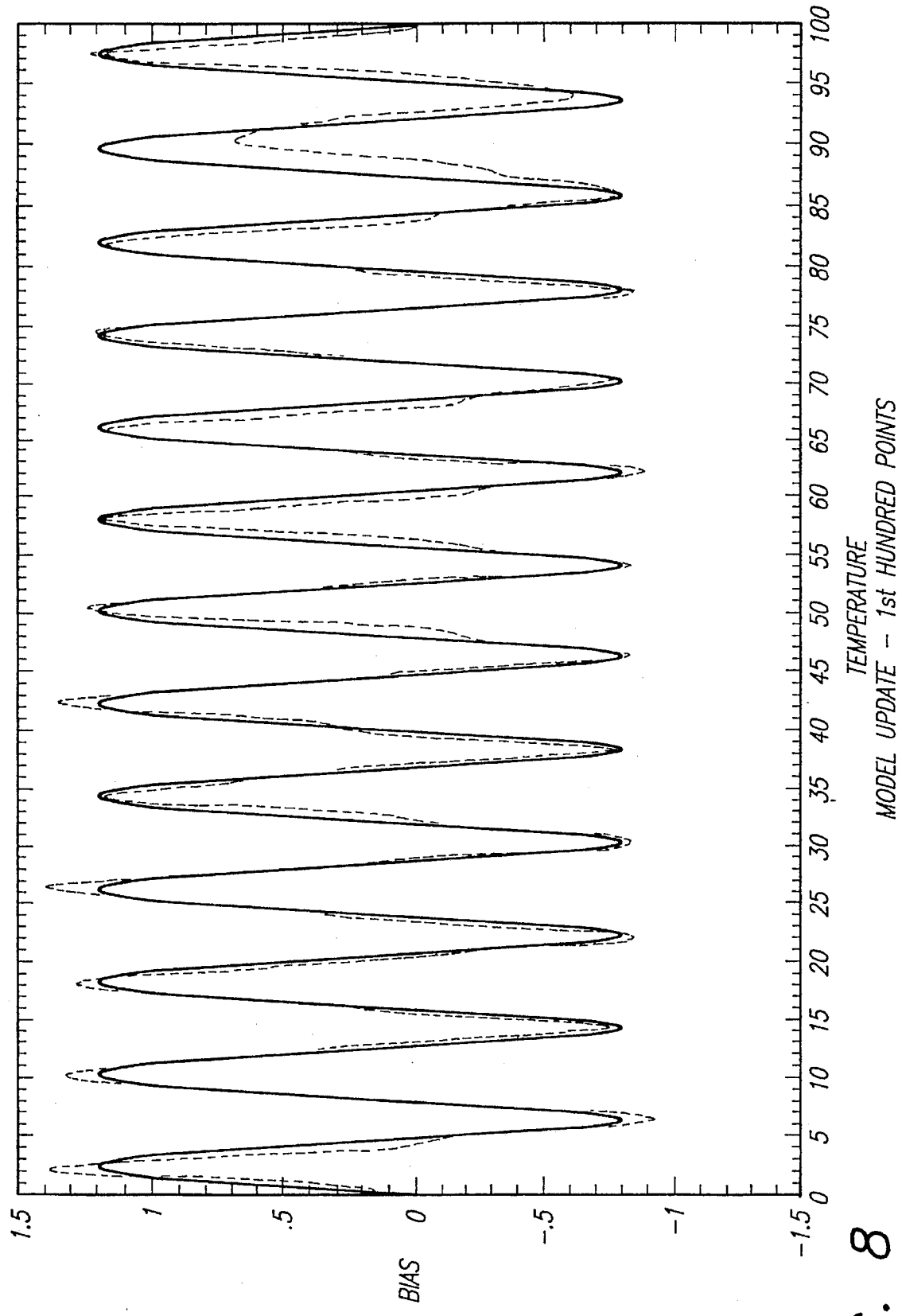
Figure 10:
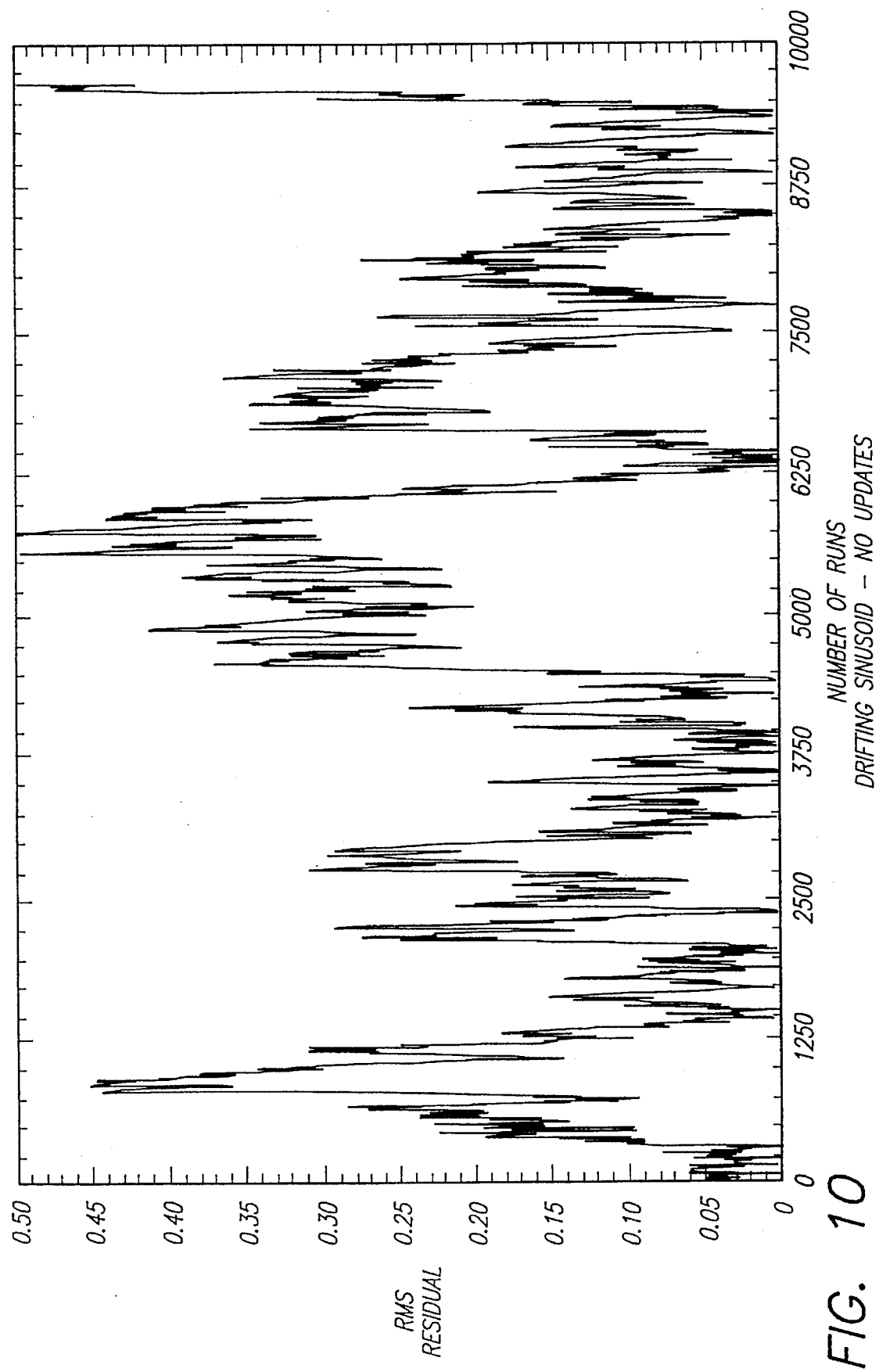
FIGS. 10 and 11 are plots of RMS residual for a sine wave function with randomly shifting phase without and with updating in accordance with the invention respectively.

FIGS. 6 through 8 are a series of waveforms that plot data generated by simulations of the thermal model update method of the invention. Each simulation is based on an initially unmodelled bias error comprising a sine wave of unit amplitude and a small offset. In FIG. 6, the effect of a single point update is shown. The solid trace labeled "bias" separates the actual bias simulated while the dashed line labeled "spline" represents the updated spline model. It is seen that the single point observation and update has resulted in a spline which better fits the actual bias in the vicinity of the observation point. FIG. 10 represents the effect of ten updates randomly selected in temperature. Again, each update improves the spline locally in the vicinity of the update temperature. FIG. 8 illustrates the effect of one hundred randomly selected updates throughout the temperature range. It is seen that the dashed "spline" curve now closely matches the solid "bias" curve at almost all temperatures.

Figure 9:
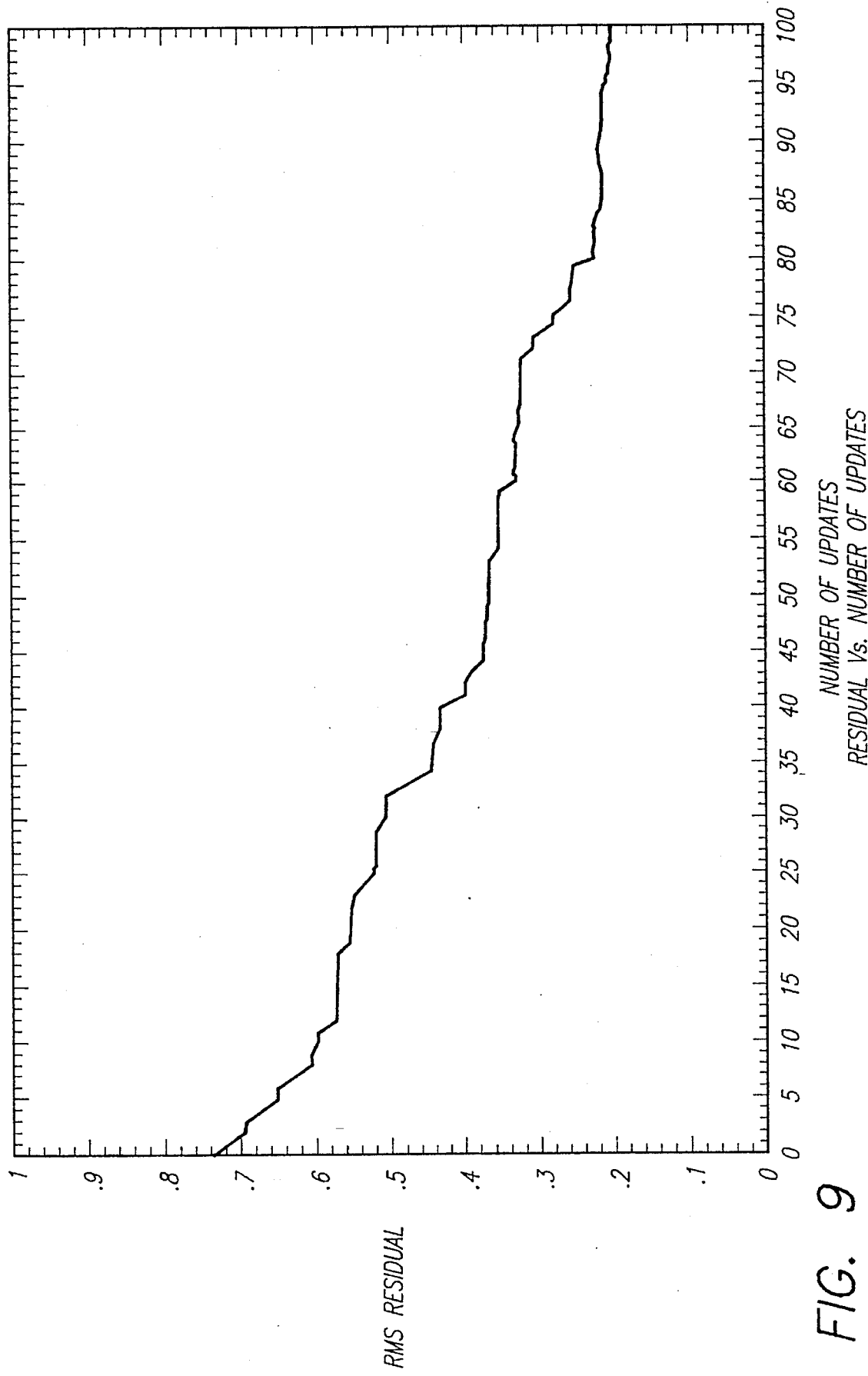
FIG. 9 is a plot of RMS residual as a function of number of updates for measuring the effectiveness of the process of the invention.
Figure 11:
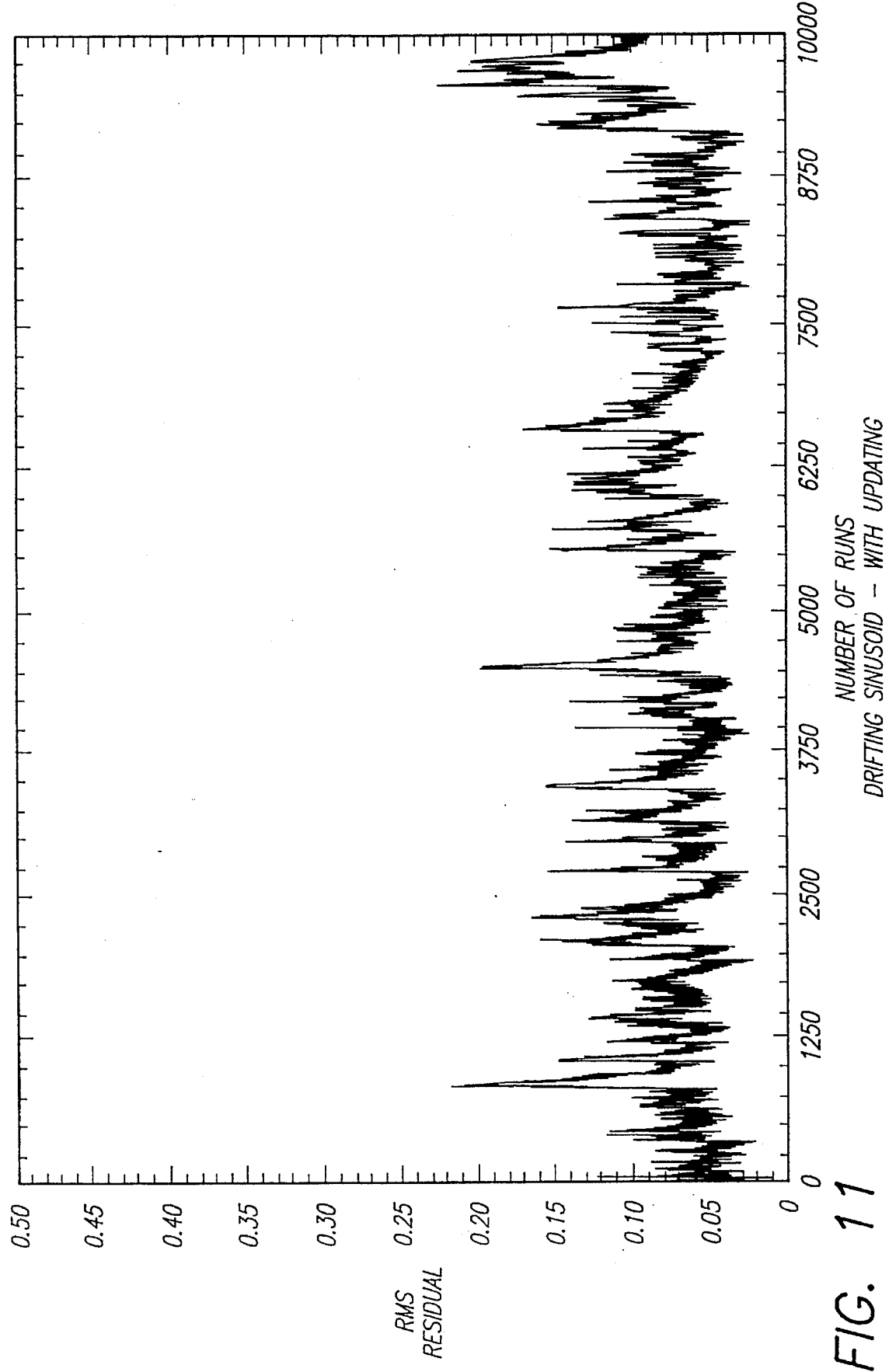

FIG. 9 is a graph of overall (i.e. over the entire temperature range) RMS residuals as a function of the number of updates for the bias characteristics discussed in relation to FIGS. 6 through 8. A continuous reduction in the RMS error is obtained with increased number of updates. FIGS. 10 and 11 are graphs of data similar to that presented in FIGS. 6 through 8 although based upon a sine wave with randomly shifting phase, i.e. of the form $A(\sin(\omega T + \phi) - \sin \omega T)$ where $\phi$ is the accumulation of a random variable. This form represents a sinusoid whose phase is shifting in time.

FIGS. 10 and 11 present data for simulations performed with $A=1.0$ (in arbitrary units) and $\sigma_{\Delta\phi}=0.015$ radians where $\sigma_{\Delta\phi}$ is the standard deviation of the sinusoid phase shift from one iteration to the next. The data of FIG. 10 discloses the results without model updating while FIG. 11 includes model updating in accordance with the invention. A comparison of the two graphs indicates a dramatic improvement in terms of the stability and boundedness of estimated bias error. This indicates that model updating as disclosed in the invention reduces bias error in the case of a changing bias-versus-temperature characteristic.

Thus it can be seen that the present invention provides a method for the thermal modelling and updating of bias errors in inertial navigation instruments. By applying the teachings of the invention, which require no hardware in addition to that already utilized in conjunction with an aircraft's INS, one can substantially improve the usefulness of the factory thermal calibrations of constituent instruments, including gyros and accelerometers, regardless of INS configuration. Thus, the method encompasses, and enhances, INS performance based upon strapdown and gimballed arrangements employing a wide range of device technologies including, but not limited to, ring laser, fiber optics, mechanical, electromechanical and piezoelectric.

While this invention has been described with reference to its presently preferred embodiment it is not limited thereto. Rather, the present invention is limited only insofar as it is defined by the following set of patent claims and includes within its scope all equivalents thereof.

APPENDIX: DERIVATION OF CUBIC SPLINE

If a function value and slope are specified on the two boundaries of an interval then it is possible to uniquely specify a third order polynomial that fits the four boundary conditions. For convenience, each interval is normalized between boundaries of $-1$ and $+1$. Then, the independent variable T maps into $X \in [-1, +1[$ within interval K. The polynomial $F_K(x)$ can then be computed to satisfy the following boundary conditions:

$$F_K(-1) = \alpha_K \qquad F_K'(-1) = \alpha_K'$$
$$F_K(+1) = \alpha_{K+1} \qquad F_K'(+1) = \alpha_{K+1}'$$

Where $\alpha_K$ is the point value on the Kth boundary and $a_K'$ is the slope value on the Kth boundary.

$$F_K(x) = b_{0K} + B_{1K}x + b_{2K}x^2 + b_{3K}x^3$$

$$F_K'(x) = b_{1K} + 2b_{2K}x + 3b_{3K}x^2$$

Thus:

$$b_{0K} - b_{1K} + b_{2K} - b_{3K} = \alpha_K$$

$$b_{0K} + b_{1K} + b_{2K} + b_{3K} = \alpha_{K+1}$$

$$b_{1K} - 2b_{2K} + 3b_{3K} = \alpha_K'$$

$$b_{1K} + 2b_{2K} + 3b_{3K} = \alpha_{K+1}'$$

These four simultaneous equations may then be solved:

$$b_{0K} = \tfrac{1}{2}(\alpha_K + \alpha_{K+1}) - \tfrac{1}{4}(\alpha_{K+1}' - \alpha_K')$$

$$b_{1K} = \tfrac{3}{4}(\alpha_{K+1} - \alpha_K) - \tfrac{1}{4}(\alpha_K' + \alpha_{K+1}')$$

$$b_{2K} = \tfrac{1}{4}(\alpha_{K+1}' - \alpha_K')$$

$$b_{3K} = \tfrac{1}{4}(\alpha_K - \alpha_{K+1}) + \tfrac{1}{4}(\alpha_K' + \alpha_{K+1}')$$

Substituting into $F_K(x)$ yields:

$$\begin{aligned}
F_K(x) &= \tfrac{1}{2}\alpha_K + \tfrac{1}{2}\alpha_{K+1} + \tfrac{1}{4}\alpha_K' - \tfrac{1}{4}\alpha_{K+1}' + \\
&\quad x(-\tfrac{3}{4}\alpha_K + \tfrac{3}{4}\alpha_{K+1} - \tfrac{1}{4}\alpha_K' - \tfrac{1}{4}\alpha_{K+1}') + \\
&\quad x^2(\phantom{-\tfrac{3}{4}\alpha_K + \tfrac{3}{4}\alpha_{K+1}} -\tfrac{1}{4}\alpha_K' + \tfrac{1}{4}\alpha_{K+1}') + \\
&\quad x^3(\tfrac{1}{4}\alpha_K - \tfrac{1}{4}\alpha_{K+1} + \tfrac{1}{4}\alpha_K' + \tfrac{1}{4}\alpha_{K+1}') \\
&= (1/2 - 3/4\,x + 1/4\,x^3)\,\alpha_K + \\
&\quad (1/2 - 3/4\,x - 1/4\,x^3)\,\alpha_{K+1} + \\
&\quad (1/4 - 1/4\,x - 1/4\,x^2 + 1/4\,x^3)\,\alpha_K' + \\
&\quad (-1/4 - 1/4\,x + 1/4\,x^2 + 1/4\,x^3)\,\alpha_{K+1}' \\
&= 1/4(2 - 3\,x + x^3)\,\alpha_K + \\
&\quad 1/4(2 + 3\,x - x^3)\,\alpha_{K-1} + \\
&\quad 1/4(1 - x - x^2 + x^3)\,\alpha_K' - \\
&\quad 1/4(1 + x - x^2 - x^3)\,\alpha_{K+1}'
\end{aligned}$$

Defining $$P_o(x) = \tfrac{1}{4}(2 - 3x + x^3) = +\text{e,fra } 1/4 + \text{ee } (2 - x(3 - x^2))$$

$$P_1(x) = \tfrac{1}{4}(2 + 3x - x^3) = +\text{e,fra } 1/4 + \text{ee } (2 + x(3 - x^2))$$

$$Q_o(x) = \tfrac{1}{4}(1 - x - x^2 + x^3) = +\text{e,fra } 1/4 + \text{ee } (1 - x(1 + x(1 - x)))$$

$$Q_1(x) = -\tfrac{1}{4}(1 + x - x^2 - x^3) = -+\text{e,fra } 1/4 + \text{ee } (1 + x(1 - x(1 + x)))$$

Then $$F_K(x) = P_o(x)\alpha_K + P_1(x)\alpha_{K+1} + Q_o(x)\alpha_K' + Q_1(x)\alpha_{K+1}'$$

What is claimed is:

1. A method for correcting the output of an inertial navigation instrument for temperature dependent bias comprising the steps of:

a) making a plurality of measurements of instrument bias; and b) making a corresponding plurality of measurements of instrument temperature; then c) associating corresponding bias and temperature measurements to form a bias-temperature model; then d) encoding said model into spline parameters by (i) subdividing said temperature range into a plurality of equal temperature intervals, each of said intervals being defined by opposed interval boundaries, then (ii) determining a series of cubic polynomial functions over said intervals representing a fit to said measured values of bias versus temperature such that said functions and slopes of said functions versus temperature are continuous over said range, and then (iii) calculating the value and slope of each of said functions at each interval boundary; then e) storing said spline parameters; then f) making an estimate of instrument bias error while in use; and g) making a measurement of instrument temperature at a corresponding time; then h) coordinating said estimate of bias error with said temperature to form an update point; then i) revising said spline parameters in accordance with said update point; then j) reading the output of said instrument; and k) measuring the temperature of said instrument; then l) calculating an instrument bias value from said stored spline parameters in accordance with said measured temperature; and then m) adjusting said output in accordance with said calculated instrument bias value.

2. A method as defined in claim 1 wherein the step of subdividing said temperature range into a plurality of equal temperature intervals further includes the step of normalizing each of said temperature intervals to a range of $-1$ to $+1$.

3. A method as defined in claim 2 wherein the step of revising said spline parameters further includes the step of identifying the temperature interval of said update point.

4. A method as defined in claim 3 wherein the step of revising said spline further includes the step of converting the update point temperature to a normalized temperature value.

5. A method as defined in claim 4 wherein the step of revising said spline further includes the step of deriving a set of polynomials that describes a unique cubic function over said interval in accordance with said normalized temperature.

6. A method as defined in claim 5 wherein the step of revising said spline further includes the step of determining increments to the boundary values and rates of change of bias of said identified interval for minimizing a predetermined criterion function.

7. A method as defined in claim 6 wherein the step of revising said spline further includes the step of adjusting said boundary values and rates of change of bias of said interval in accordance with said increments.

8. A method as defined in claim 5 wherein said polynomials are of the form:

$P_o(x) = \frac{1}{4}(2-x(3-x^2))$ $P_1(x) = \frac{1}{4}(2+x(3-x^2))$ $Q_o(x) = \frac{1}{4}(1-x(1+x(1-x)))$ $Q_1(x) = -\frac{1}{4}(1+x(1-x(1+x)))$ where x is said normalized temperature value.

9. A method as defined in claim 8 wherein said unique cubic polynomial $F_K(x)$ is of the form $F_K(x) = P_o(x)\alpha_K + P_1(x)\alpha_{K+1} + Q_o(x)\alpha_K' + Q_1(x)\alpha_{K+1}'$ where $\alpha_K$, $\alpha_{K+1}$ are values of bias error at opposed boundaries of the Kth temperature interval and $\alpha_K'$, $\alpha_{K+1}'$ are rates of change of bias with temperature at said boundaries.

10. A method as defined in claim 9 wherein said criterion function is $\alpha_K^2 + \alpha_{K+1}^2 + (\alpha_K')^2 + (\alpha_{K+1}')^2$.

11. A method for correcting the thermal model of bias of an inertial measurement device comprising a plurality of corresponding values of instrument bias and temperature, said method comprising the steps of:

a) encoding said model as a spline by (i) subdividing said temperature range into a plurality of equal temperature intervals, then (ii) determining a series of cubic polynomial functions over said intervals representing a fit to said measured values of bias versus temperature such that said functions and slopes of said functions versus temperature are continuous over said range, and then (iii) calculating the value and slope of each of said functions at each interval boundary; then b) storing said parameters that define said spline; then c) estimating instrument bias at an observed instrument temperature; and d) associating said estimate with said observed temperature to form an update point; then e) revising said parameters in accordance with said update point; and then f) computing instrument bias as a function of temperature using said spline.

12. A method as defined in claim 11 wherein the step of subdividing said temperature range into a plurality of equal temperature intervals further includes the step of normalizing each of said temperature intervals to a range of $-1$ to $+1$.

13. A method as defined in claim 12 wherein the step of revising said spline parameters further includes the step of identifying the temperature interval of said update point.

14. A method as defined in claim 13 wherein the step of revising said spline further includes the step of converting the update point temperature to a normalized temperature value.

15. A method as defined in claim 14 wherein the step of revising said spline further includes the step of deriving a set of polynomials that describes a unique cubic function over said interval in accordance with said normalized temperature.

16. A method as defined in claim 15 wherein the step of revising said spline further includes the step of determining increments to the boundary values and rates of change of bias of said identified interval for minimizing a predetermined criterion function.

17. A method as defined in claim 16 wherein the step of revising said spline further includes the step of adjusting said boundary values and rates of change of bias of said interval in accordance with said increments.

18. A method as defined in claim 17 wherein said polynomials are of the form:

$P_o(x) = \frac{1}{4}(2-x(3-x^2))$ $P_1(x) = \frac{1}{4}(2+x(3-x^2))$ $Q_o(x) = \frac{1}{4}(1-x(1+x(1-x)))$ $Q_1(x) = -\frac{1}{4}(1+x(1-x(1+x)))$ where x is said normalized temperature value.

19. A method as defined in claim 18 wherein said unique cubic polynomial $F_K(x)$ is of the form $$F_K(x)=P_o(x)\alpha_K+P_1(x)\alpha_{K+1}+Q_o(x)\alpha_K'+Q_1(x)\alpha_{K+1}'$$

where $\alpha_K$, $\alpha_{K+1}$ are values of bias error at opposed boundaries of the Kth temperature interval and $\alpha_K'$, $\alpha_{K+1}'$ are rates of change of bias with temperature at said boundaries.

20. A method as defined in claim 19 wherein said criterion function is $$\alpha_K^2+\alpha_{K+1}^2+(\alpha_K')^2+(\alpha_{K+1}')^2.$$

21. A method for in-field updating of the thermal model of bias of an inertial measurement device comprising a series of parameters characterizing instrument bias over a predetermined temperature range, said method comprising the steps of:
  a) measuring the value of bias at a plurality of temperatures throughout said range; then
  b) subdividing said temperature range into a plurality of equal temperature intervals, each of said intervals being defined by opposed interval boundaries; then
  c) determining a series of cubic polynomial functions over said intervals representing a fit to said measured values of bias versus temperature such that said functions and slopes of said functions versus temperature are continuous over said range; then
  d) calculating the value and slope of each of said functions at each interval boundary; and
  e) storing said values and slopes; then
  f) estimating instrument bias error at an observed instrument temperature; then
  g) associating said estimate with said observed temperature to form an update point; and then
  h) revising at least one of said values and slopes in accordance with said update point.

22. A method as defined in claim 21 wherein the step of subdividing said temperature range into a plurality of equal temperature intervals further includes the step of normalizing each of said temperature intervals to a range of −1 to +1.

23. A method as defined in claim 22 wherein the step of revising said spline parameters further includes the step of identifying the temperature interval of said update point.

24. A method as defined in claim 23 wherein the step of revising said spline further includes the step of converting the update point temperature to a normalized temperature value.

25. A method as defined in claim 24 wherein the step of revising said spline further includes the step of deriving a set of polynomials that describes a unique cubic function over said interval in accordance with said normalized temperature.

26. A method as defined in claim 25 wherein the step of revising said spline further includes the step of determining increments to the boundary values and rates of change of bias of said identified interval for minimizing a predetermined criterion function.

27. A method as defined in claim 26 wherein the step of revising said spline further includes the step of adjusting said boundary values and rates of change of bias of said interval in accordance with said increments.

28. A method as defined in claim 27 wherein said polynomials are of the form:

$$P_o(x)=\tfrac{1}{4}(2-x(3-x^2))$$

$$P_1(x)=\tfrac{1}{4}(2+x(3-x^2))$$

$$Q_o(x)=\tfrac{1}{4}(1-x(1+x(1-x)))$$

$$Q_1(x)=-\tfrac{1}{4}(1+x(1-x(1+x)))$$

where x is said normalized temperature value.

29. A method as defined in claim 28 wherein said unique cubic polynomial $F_K(x)$ is of the form $$F_K(x)=P_o(x)\alpha_K+P_1(x)\alpha_{K+1}+Q_o(x)\alpha_K'+Q_1(x)\alpha_{K+1}'$$

where $\alpha_K$, $\alpha_{K+1}$ are values of bias error at opposed boundaries of the Kth temperature interval and $\alpha_K'$, $\alpha_{K+1}'$ are rates of change of bias with temperature at said boundaries.

30. A method as defined in claim 29 wherein said criterion function is $$\alpha_K^2+\alpha_{K+1}^2+(\alpha_K')^2+(\alpha_{K+1}')^2.$$

* * * * *